US009937818B2

(12) United States Patent
Newman

(10) Patent No.: US 9,937,818 B2
(45) Date of Patent: Apr. 10, 2018

(54) VEHICLE HAVING A RIGID FRAME STRUCTURE FOR RECEIVING A REPLACEABLE BATTERY PACK

(71) Applicant: NIO USA, Inc., San Jose, CA (US)

(72) Inventor: Austin L. Newman, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/224,659

(22) Filed: Jul. 31, 2016

(65) Prior Publication Data

US 2017/0225587 A1 Aug. 10, 2017

Related U.S. Application Data

(60) Provisional application No. 62/293,220, filed on Feb. 9, 2016, provisional application No. 62/300,467, filed on Feb. 26, 2016.

(51) Int. Cl.
*B60L 11/18* (2006.01)
*H01M 2/10* (2006.01)
(Continued)

(52) U.S. Cl.
CPC ............ *B60L 11/1879* (2013.01); *B60K 1/04* (2013.01); *B60L 11/1822* (2013.01); *B60L 11/1846* (2013.01); *B60L 11/1877* (2013.01); *B60S 5/06* (2013.01); *H01M 2/1077* (2013.01); *H01M 2/1083* (2013.01); *H01M 2/206* (2013.01); *H01M 10/613* (2015.04); *H01M 10/625* (2015.04); *H01M 10/6557* (2015.04); *H02J 7/0027* (2013.01); *B60K 2001/0438* (2013.01); *B60K 2001/0472* (2013.01);
(Continued)

(58) Field of Classification Search
CPC .... B60L 11/1879; B60L 11/1877; B60K 1/04; B60K 2001/0438
See application file for complete search history.

(56) References Cited

U.S. PATENT DOCUMENTS 4,317,497 A 3/1982 Alt et al.
5,501,289 A 3/1996 Nishikawa et al.
(Continued)

FOREIGN PATENT DOCUMENTS

DE 202015005208 8/2015

OTHER PUBLICATIONS

International Search Report and Written Opinion for International Patent Application No. PCT/US17/17137, dated Jun. 7, 2017, 13 pages.

(Continued)

*Primary Examiner* — Brian L Swenson
(74) *Attorney, Agent, or Firm* — Sheridan Ross P.C.

(57) ABSTRACT

A vehicle has a body forming a passenger compartment. The vehicle also has a chassis supporting the body. The chassis includes a frame structure having a pair of side rails running longitudinally along the body, a plurality of rigid cross rails extending perpendicular to the side rails and attached at opposing ends to the side rails, and at least one bay defined between the plurality of cross rails. The vehicle also has a battery system including a battery pack. The battery pack has a plurality of electrical storage devices. The battery pack is secured to the side rails and removably positioned in the at least one bay.

20 Claims, 6 Drawing Sheets

(51) Int. Cl.
  *H01M 2/20*    (2006.01)
  *H01M 10/613*  (2014.01)
  *H01M 10/625*  (2014.01)
  *H01M 10/6557* (2014.01)
  *B60S 5/06*    (2006.01)
  *H02J 7/00*    (2006.01)
  *B60K 1/04*    (2006.01)

(52) U.S. Cl.
  CPC ....... *B60L 2230/16* (2013.01); *B60L 2230/40* (2013.01); *B60Y 2200/90* (2013.01); *B60Y 2306/01* (2013.01); *H01M 2200/00* (2013.01); *H01M 2220/20* (2013.01)

(56) References Cited

U.S. PATENT DOCUMENTS

| | | | |
|---|---|---|---|
| 7,201,384 | B2 | 4/2007 | Chaney |
| 7,507,499 | B2 | 3/2009 | Zhou et al. |
| 7,913,788 | B1 * | 3/2011 | Bryer ................ B60K 1/04 180/68.5 |
| 8,051,934 | B2 | 11/2011 | Kiya et al. |
| 8,091,669 | B2 | 1/2012 | Taneda et al. |
| 8,210,301 | B2 | 7/2012 | Hashimoto et al. |
| 8,322,476 | B2 | 12/2012 | Komaki |
| 8,409,749 | B2 | 4/2013 | Nishino et al. |
| 8,839,895 | B2 | 9/2014 | Kato et al. |
| 9,045,030 | B2 | 6/2015 | Rawlinson et al. |
| 9,321,338 | B2 | 4/2016 | Naruke |
| 9,490,460 | B2 | 11/2016 | Yanagi |
| 9,630,483 | B2 | 4/2017 | Yamada et al. |
| 2010/0009244 | A1 | 1/2010 | Murata |
| 2011/0198138 | A1 | 8/2011 | Sadrmajles et al. |
| 2012/0009804 | A1 | 1/2012 | Heichal et al. |
| 2012/0312612 | A1 * | 12/2012 | Harrison, III ............ B60K 1/04 180/68.5 |
| 2013/0175829 | A1 | 7/2013 | Kim et al. |
| 2013/0270864 | A1 | 10/2013 | Young et al. |
| 2014/0284125 | A1 * | 9/2014 | Katayama ................ B60K 1/04 180/68.5 |
| 2014/0315064 | A1 | 10/2014 | Katayama et al. |
| 2014/0329125 | A1 | 11/2014 | Miyanaga et al. |
| 2014/0338998 | A1 | 11/2014 | Fujii et al. |
| 2014/0338999 | A1 * | 11/2014 | Fujii ........................ B60K 1/04 180/68.5 |
| 2015/0255764 | A1 * | 9/2015 | Loo ..................... H01M 2/1083 429/149 |
| 2016/0068195 | A1 * | 3/2016 | Hentrich ................. B60K 1/04 180/68.5 |
| 2016/0137229 | A1 * | 5/2016 | Nishida ................. B62D 23/00 296/181.2 |
| 2017/0225558 | A1 | 2/2017 | Newman et al. |

OTHER PUBLICATIONS

Notice of Allowance for U.S. Appl. No. 15/224,660, dated Apr. 26, 2017, 8 pages.
Official Action for U.S. Appl. No. 15/224,661, dated Jun. 6, 2017, 8 pages, Restriction Requirement.
Official Action for U.S. Appl. No. 15/429,095, dated Oct. 26, 2017, 12 pages.
Official Action for U.S. Appl. No. 15/224,661, dated Sep. 19, 2017, 13 pages.
U.S. Appl. No. 15/224,660, filed Jul. 31, 2016, Newman.
U.S. Appl. No. 15/224,661, filed Jul. 31, 2016, Newman.
U.S. Appl. No. 15/246,856, filed Aug. 25, 2016, Newman et al.
Official Action for U.S. Appl. No. 15/224,660, dated Jan. 26, 2017, 6 pages, Restriction Requirement.

* cited by examiner

VEHICLE HAVING A RIGID FRAME STRUCTURE FOR RECEIVING A REPLACEABLE BATTERY PACK

PRIORITY CLAIM

This application claims priority under 35 U.S.C. § 119 to U.S. Provisional Application No. 62/293,220, filed on Feb. 9, 2016, and U.S. Provisional Application No. 62/300,467, filed on Feb. 26, 2016, both of which are expressly incorporated by reference herein in their entirety.

FIELD OF INVENTION

The present invention relates to a vehicle having a rigid frame structure, and, more particularly, to a vehicle frame structure that includes interconnected rail members creating a space for receiving and protecting a replaceable battery pack.

BACKGROUND

Electric vehicles have proven to be a viable alternative to gasoline-powered cars. The increasing demand for electric vehicles has placed importance on the development of the associated technology and the planning of an infrastructure that will support the many electric vehicles that will be on the roads in the future.

Most of the electric vehicles currently on the market were designed and manufactured according to a recharging-model, in which a vehicle uses the same, periodically-recharged battery pack over a long period of time. This model suffers from some drawbacks, however, because it requires car owners to allot an amount of time for recharging in which the car cannot be used. Further, planning must be made to ensure that the vehicle is near a charging station when the battery needs to be recharged. This limits the use of the vehicle to certain routes, ranges, and locations.

Vehicles designed and manufactured according to a battery replacement-model, on the other hand, allow a drained battery to be replaced with a charged battery, instead of recharged while connected to vehicle. These vehicles may overcome many of the problems associated with the recharging-model if an associated battery replacement process is otherwise faster than and more readily-available than the alternative recharging process. Moreover, a replacement-battery infrastructure may be more feasible and applicable for at least some implementation areas than its recharging-model counterpart. In order to achieve these goals a viable design would include features that address issues such as standardization, safety, ease-of-use, and logistics. However, current battery replacement-model electric vehicles have yet to find solutions for many of the problems that arise in these areas.

Regarding safety, many current electric vehicle designs rely on a rigidity of a battery pack itself to protect the battery cells from damage caused by a collision impact. For example, U.S. Pat. Nos. 8,210,301 and 9,045,030 depict battery packs for electric vehicles that include integrated rigid frame structures that absorb energy during an impact event to protect the battery cells that are also disposed in the battery packs.

While this configuration may be useful for designs in which the battery pack will be maintained in the same vehicle and recharged when needed, it suffers from some drawbacks when applied to a replaceable-battery scheme. In particular, the internal frame structure adds weight to the battery packs, rendering an associated replacement process more cumbersome and difficult. Moreover, the design requires the battery pack to be precisely positioned within the vehicle such that impact forces are properly transferred from the vehicle frame to the battery pack. These positioning requirements would further complicate and lengthen an associated replacement process.

The present disclosure is directed to overcoming one or more problems of the prior art.

SUMMARY

In one aspect, the present disclosure is directed to a vehicle. The vehicle includes a body forming a passenger compartment. The vehicle also includes a chassis supporting the body. The chassis includes a frame structure including a pair of side rails running longitudinally along the body, a plurality of rigid cross rails extending perpendicular to the side rails and attached at opposing ends to the side rails, and at least one bay defined between the plurality of cross rails. The vehicle also includes a battery system including a battery pack. The battery pack has a plurality of electrical storage devices. The battery pack is secured to the side rails and removably positioned in the at least one bay.

In another aspect, the present disclosure is directed to a battery protection system. The battery protection system includes a vehicle frame structure. The vehicle frame structure includes a pair of longitudinally-extending side rails interconnected by a plurality of rigid, transversely-extending cross rails. The vehicle frame structure defines a plurality of bays between the side rails and separated by the cross rails. The battery protection system also includes a battery pack comprising a plurality of electrical storage devices enclosed in a container. The container includes at least one channel defined in an upper portion of the container. The battery pack is removably positioned in at least two of the plurality of bays with the container secured to the side rails and a cross rail of the plurality of cross rails positioned in the channel.

In yet another aspect, the present disclosure is directed to a battery pack. The battery pack includes a container, a plurality of electrical storage devices at least partially enclosed in the container, a fastening mechanism for securing the container to a frame structure, and at least one channel defined in an upper portion of the container, the at least one channel including a pair of converging side walls configured to receive a tapered cross rail of the frame structure.

BRIEF DESCRIPTION OF THE DRAWING(S)

The foregoing summary and the following detailed description will be better understood when read in conjunction with the appended drawings, which illustrate a preferred embodiment of the invention. In the drawings.

DETAILED DESCRIPTION OF THE PREFERRED EMBODIMENT(S)

Disclosed embodiments provide a structural configuration for an electric vehicle. The structural configuration includes a frame structure for receiving a replaceable battery pack. The frame structure is formed into and is integral with a chassis of the vehicle. The frame structure includes a plurality of rigid interconnected components which create a space for receiving one or more of the replaceable battery packs. The frame structure forms a rigid skeleton which is configured to protect the battery packs during a collision. This configuration allows the battery pack to be a separate component from the frame structure and alleviates the need for the battery pack to include its own internal frame structure. This configuration also reduces a load carried by a connection between the battery pack and the frame structure, thereby allowing for the use of a variety of different connection mechanisms.

Figure 1:
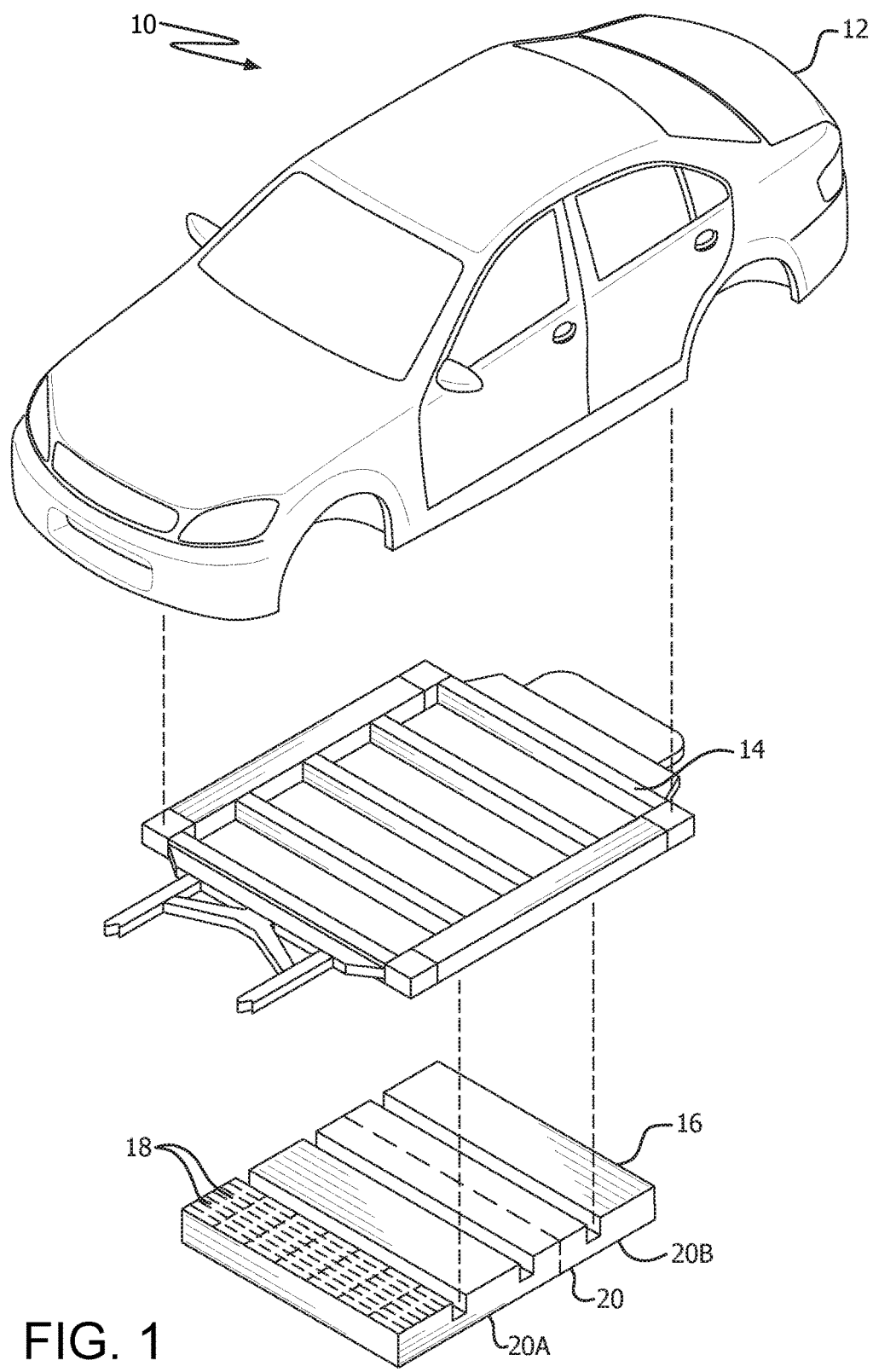
FIG. 1 is an exploded view of an exemplary vehicle.

FIG. 1 is an exploded view illustrating an exemplary vehicle 10. Vehicle 10 includes at least a body 12, a chassis 14, and a battery system 16. The body 12 includes the features and components that form the passenger compartment and exterior shell of the vehicle 10. The body 12 is supported on and by the chassis 14. The chassis 14 is a skeleton frame structure which includes, for example, a plurality of interconnected frame components, such as rigid bars, plates, fasteners, etc. The chassis 14 forms a base for supporting the body 12 and which is supported off of the ground by the wheels of the vehicle 10. The chassis 14 essentially forms a bottom portion of the vehicle 10. The battery system 16 is integrated into the body 12 and chassis 14 and provides electrical energy to a power system of the vehicle 10 through a plurality of electrical storage devices 18 provided in one or more battery packs 20.

Consistent with disclosed embodiments, vehicle 10 is an electric vehicle. This means that the electrical storage devices 18 provide electrical energy to a motor (not shown) for generating mechanical power to move the vehicle 10. For example, in some embodiments, vehicle 10 is an all-electric vehicle in which all or substantially all of the power generated to move vehicle 10 is provided by the electrical storage devices 18. In these embodiments, the vehicle 10 includes an engine only as a backup power source or does not include an engine. In other embodiments, vehicle 10 is a hybrid vehicle in which some of the power generated by the power system 16 is provided by the electrical storage devices 18 and a remainder of the power is provided by an engine, such as an internal combustion engine.

It should be understood that the battery system 16 includes additional components which allow the electrical storage devices 18 to be utilized to provide electrical energy to a motor to power the vehicle 10. For example, the battery system 16 may include electrical connections (e.g., wiring, bus bars, etc.), cooling features (e.g., cooling panels), control system components (e.g., controllers, sensors, actuators, etc.), and the like, in order to allow the vehicle 10 to operate via electrical energy.

Figure 2:
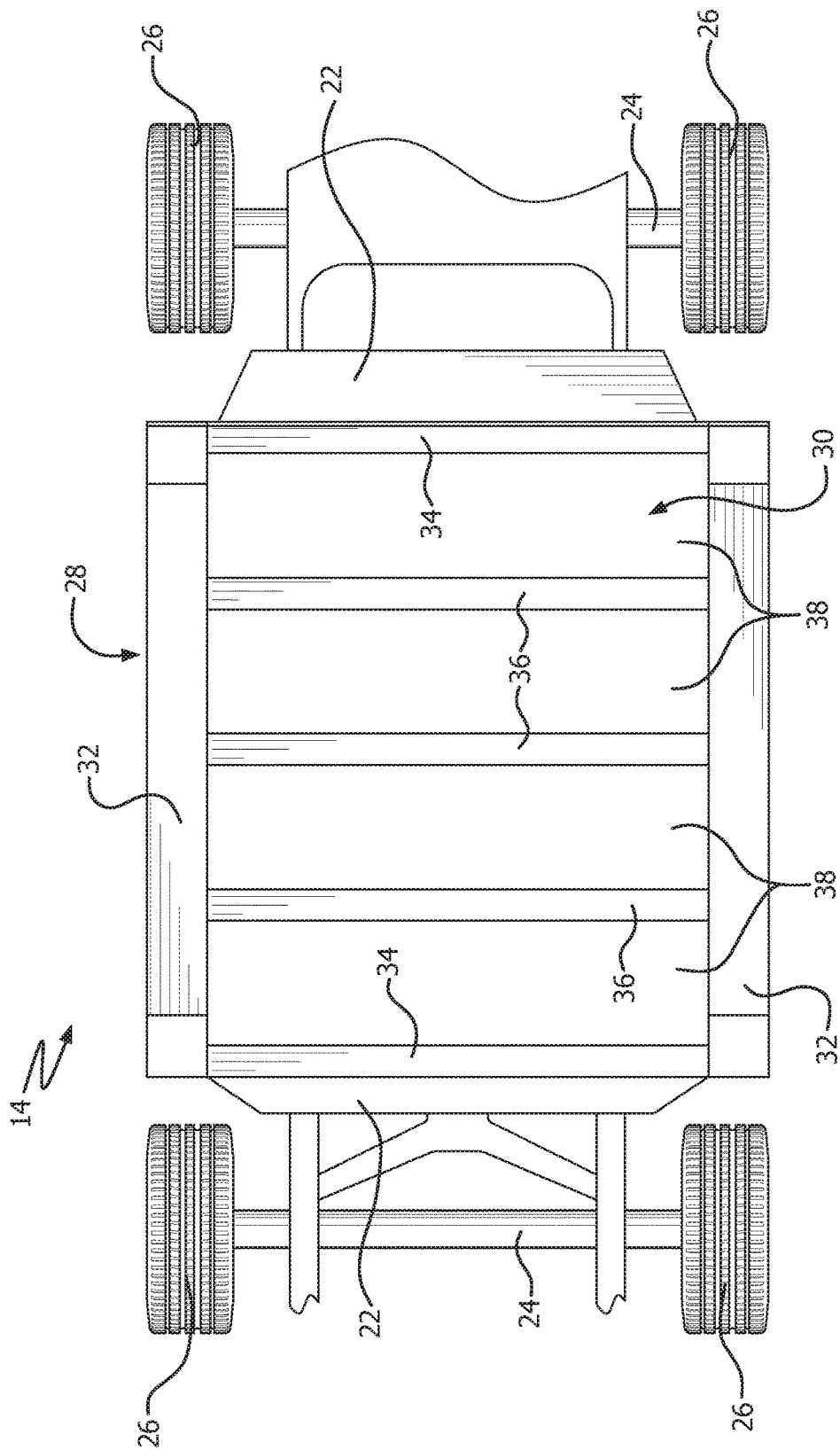
FIG. 2 is a top view of a chassis of the vehicle of FIG. 1, including a frame structure for receiving a replaceable battery pack.

FIG. 2 is a top view of the chassis 14 of the vehicle 10. In an exemplary embodiment, the chassis 14 includes front and rear brackets 22 for securing to front and rear axles 24 of the vehicle 10. The front and rear axles 24 include the vehicle wheels 26 secured at either end for supporting the chassis 14 off of the ground. As shown in FIG. 2, the chassis 14 further includes a frame structure 28 integrally formed therewith. In an exemplary embodiment, the frame structure 28 includes a plurality of interconnected bars which form a space 30 for receiving one or more battery packs 20 of the battery system 16. The frame structure 28, together with the battery pack 20, forms a battery protection system configured to protect the battery packs 20 received in the space 30.

In an exemplary embodiment, the frame structure 28 includes a pair of side rails 32 which run longitudinally on opposing sides of the vehicle 10. The side rails are interconnected at their ends by end rails 34. In an exemplary embodiment, the end rails 34 are respectively secured to the front and rear brackets 22. It should be understood, however, that the end rails 34 may be any connecting member of the chassis 14, and are not necessarily formed at the ends of the chassis 14.

As shown in FIG. 2, the frame structure 28 further includes a plurality of cross rails 36. The cross rails 36 run transverse to the vehicle 10, perpendicular to the side rails 32. The cross rails 36 are preferably formed from a high-strength material, such as steel, such that the cross rails 36 are rigid. Respective ends of the cross rails 36 are fastened to the side rails 32 such that a plurality of bays 38 are formed between the side rails 32, separated by the cross rails 36.

Figure 3:
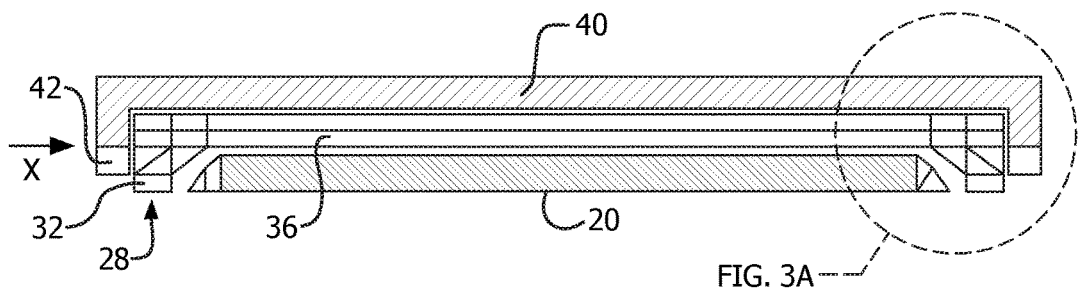
FIG. 3 is a transverse cross-sectional view of a lower portion of the vehicle of FIG. 1.

FIG. 3 is a transverse cross-sectional view of a lower portion of the vehicle 10, including a lower portion of the body 12, the chassis 14, and the battery system 16. The battery system 16 is arranged so that the battery packs 20 are positioned beneath a floor panel 40 of the body 12. In some embodiments, each side rail 32 is attached to a respective side runner panel 42 of the body 12. The battery pack 20 is positioned between the side rails 32 and at least partially beneath the cross rail 36.

Figure 3A:
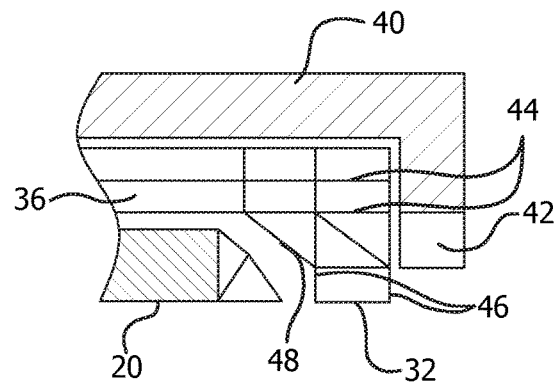
FIG. 3A is an enlarged cross-sectional view of a portion of the vehicle of FIG. 3.

As shown in FIG. 3A, the side rails 32 are formed of a plurality of interconnected panels, including horizontally-extending panels 44 and vertically-extending panels 46. In addition, side rails 32 may further include one or more diagonal bracing members 48 which further reinforce the interconnected panels that form the side rails 32.

The exemplary disclosed side rails 32 include a configuration in which a force near the battery system 16 from an impact received on a side of the vehicle 10 is carried primarily by the rigid cross rails 36. For example, an impact force which acts in a direction 100 on a side rail 32 is transferred to the cross rail 36 which is able to withstand the force without buckling. This is due, at least in part, to the cross rails 36 being interconnected with the same side rails 32, formed from a high strength material, and being integrated into the chassis 14 of the vehicle 10. The replaceable battery packs 20 may be separate components removably positioned within the bays 38 and protected by the rigid frame structure 28 formed by the side rails 32 and the cross rails 36.

Figure 4:
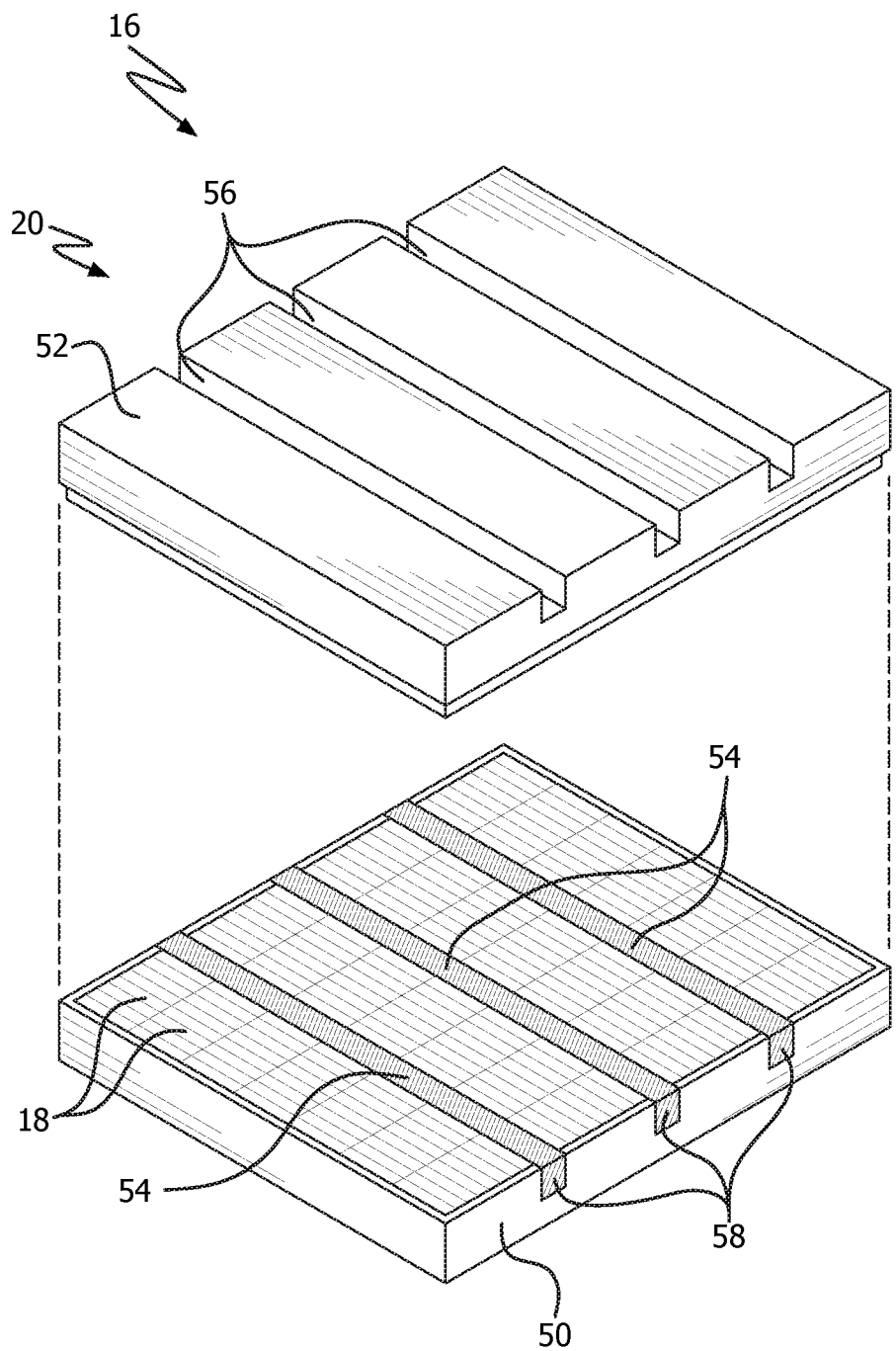
FIG. 4 is an illustration of an exemplary replaceable battery pack.

FIG. 4 illustrates an exploded view of a battery pack 20. The battery pack 20 includes a container 50 and a plurality of electrical storage devices 18 positioned in the container 50. A lid 52 (which may be a separate or integral part of the container 50) covers and encloses the electrical storage devices 18 in the container 50. The size, amount, and positioning of the electrical storage devices 18 in the container 50 is not limited to any particular configuration. In some embodiments, the battery pack 20 may include groups of electrical storage devices 18 having one or more partitions 54 positioned therebetween.

Each battery pack 20 preferably includes at least one channel 56 defined at an upper portion thereof. Each channel 56 extends transversely across the battery pack 20. Each channel 56 is formed at least by the lid 52 of the battery pack. In at least some embodiments, at least one channel 56 is formed in a middle portion of the battery pack 20. In other words, at least one channel is spaced from the longitudinal ends of the battery pack 20. The channel(s) 56 formed in the container 50 are preferably shaped to help guide the battery pack 20 into the space 30, as will be described in greater detail below.

In some embodiments, openings 58 are formed on opposing sides of the container 50. The openings 58 may be aligned with the channel 56 formed in the lid 52 such that the walls forming the channel 56 are received in the openings 58. In an exemplary embodiment, the partitions 54 are aligned with and positioned beneath the openings 58 such that the channel 56 sits above the partition 54. In this way, each partition 54 and channel 56 forms a combined separating partition which separates the groups of electrical storage devices 18.

It should be understood that the configuration of the battery pack depicted in FIG. 4 is exemplary and that other configurations are possible. For example, the channels 56 may be formed in the container 50 and separate lids or coverings may be used to cover the different groups of electrical storage devices 18. Moreover, the lid or lids 52 may be removable from the container 50, permanently attached to the container 50, or integrally formed with the container 50. A battery pack 20 including at least one channel 56 encompasses the many possible configurations, including those in which the channel 56 is formed in the container 50, the lid 52, or both.

Figure 5:
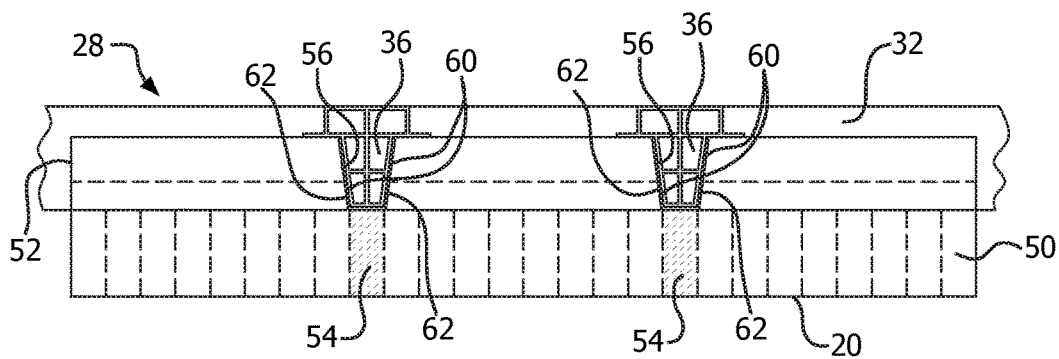
FIG. 5 is a longitudinal cross-sectional view of a lower portion of the vehicle of FIG. 1.
Figure 6:
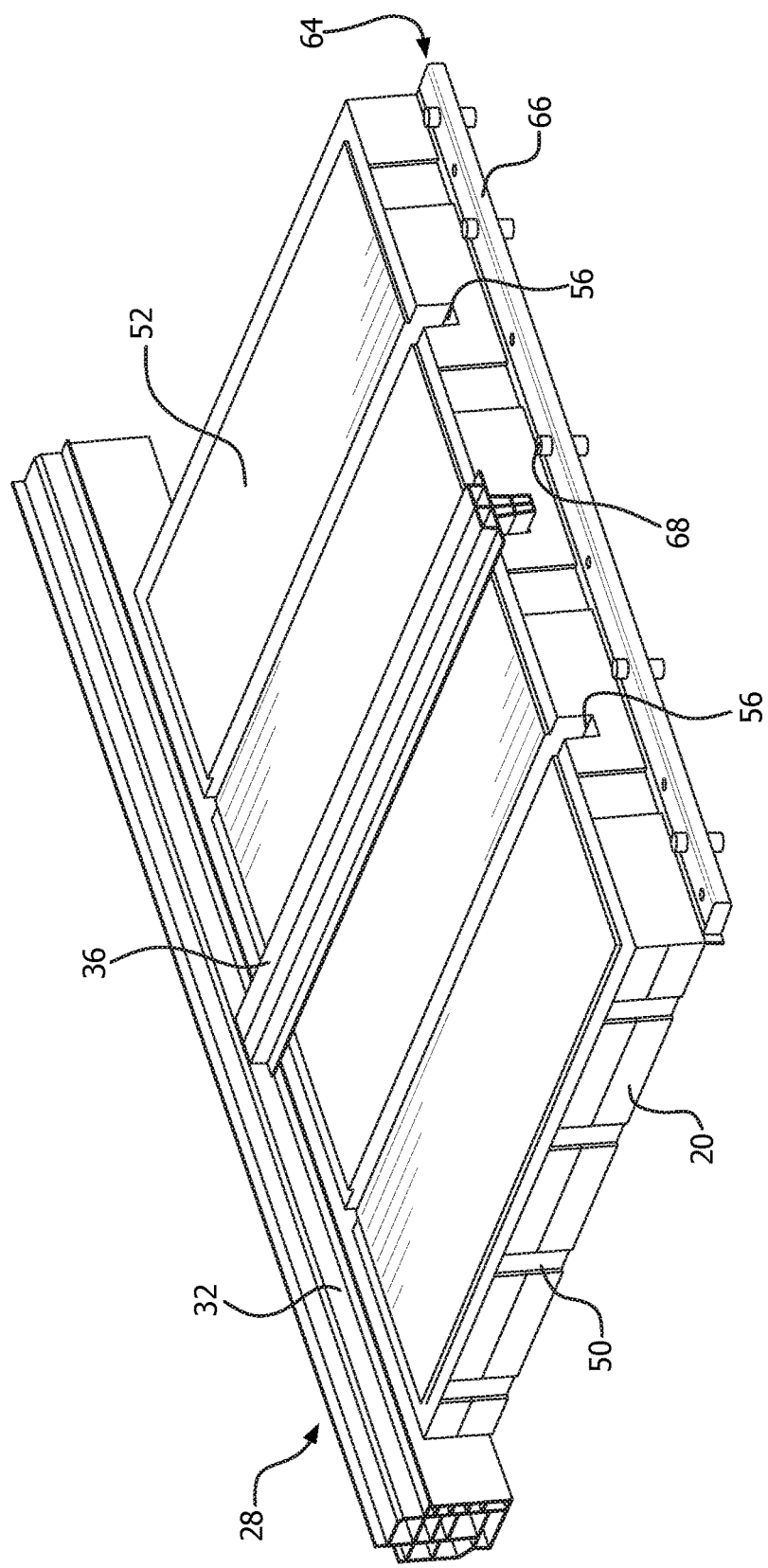
FIG. 6 is a perspective view of a replaceable battery pack secured to a frame structure.

As shown in FIGS. 5-6, the battery pack 20 is configured to be positioned in at least one bay 38 defined by the frame structure 28. Preferably, one battery pack 20 is positioned in a plurality of bays 38 defined by the frame structure 28. In other words, the battery pack 20 is positioned such that it longitudinally traverses a cross rail 36. Each channel 56 formed in the battery pack 20 is configured to receive a cross rail 36. In an exemplary embodiment, the battery pack 20 includes at least three channels 56 and the frame structure 28 includes at least three cross rails 36.

In some embodiments, the battery system 16 may include a plurality of battery packs 20. For example, the battery system 16 may include a first battery pack 20A and a second battery pack 20B (shown as an alternative in FIG. 1). Each battery pack 20 may include one or more channels 56 for receiving a corresponding cross rail 36. In other embodiments, the plurality of battery packs 20 may include cutouts at the longitudinal sides thereof in order to form the channels 56 at the locations where the plurality of battery packs 20 are adjacent to each other (e.g., two battery packs 20 form a single channel 56).

FIG. 5 illustrates a longitudinal cross-sectional view of battery pack 20 and the frame structure 28 of the chassis 14. The channels 56 formed in the container 50 and/or lid 52 are sized and shaped to receive the cross rails 36. In an exemplary embodiment, the cross rails 36 include a trapezoidal or generally triangular cross-section such that the cross rail 36 is tapered. For example, the cross rail 36 includes a pair of converging side walls 60. The channels 56 preferably include a corresponding shape which also includes converging side walls 62, generally parallel to the side walls 60.

The tapered configuration allows the battery pack 20 to easily be positioned with respect to the frame structure 28. For example, the larger upper end of the channel 56 and the smaller lower end of the cross rails 36 create an initially large tolerance for the cross rail 36 to be received in the corresponding channel 56. As the battery pack 20 is raised into the space 30, the converging side walls 62 of the channels 56 are guided by the converging side walls 60 of the cross rails 36.

FIG. 6 illustrates a perspective view of an exemplary battery pack 20 and portions of the frame structure 28. In an exemplary embodiment, the battery pack 20 includes three channels 56 formed in the lid 52. The frame structure 28 includes three corresponding cross rails 36 (only one shown) which are received in the channels 56. In a preferred embodiment, the cross rail 36 is longer than the corresponding channel 56 such that a portion of the cross rail 36 projects laterally out of the channel 56 and to a corresponding side rail 32. In this way, absent major deformation to the cross rail 36, an impact force will not directly impinge on the battery pack 20, thereby protecting the battery pack 20 from damage during a collision. As also shown in FIG. 6, each cross rail 36 includes a first portion and a second portion that extends perpendicular to the first portion. Each first portion contacts a top surface of the container 50 (e.g., lid 52) adjacent to a respective channel 56. For example, each first portion is hollow and includes a flange which extends outwardly and contacts the top surface of the container 50. Each second portion extends into the respective channel 56. Each second portion may also be hollow. The first portion and the second portion may be hollow from one end of the cross rail 36 to the other end of the cross rail 36.

In some embodiments, one or more additional safety features may be implemented in order to further protect the battery pack 20. In one example, the battery pack 20 may include a puncture resistance feature. Puncturing of the battery pack 20 may lead to undesirable conditions, such as malfunctioning of the electrical storage devices 18, leaking of corrosive materials, and elevated temperatures that lead to a fire. In some embodiments, one or more panels or walls of the battery pack 20 may be formed from a puncture resistant material which substantially prevents the puncturing of the battery pack 20 (e.g., by parts or debris which impinge on the battery pack 20 during a collision).

Figure 7:
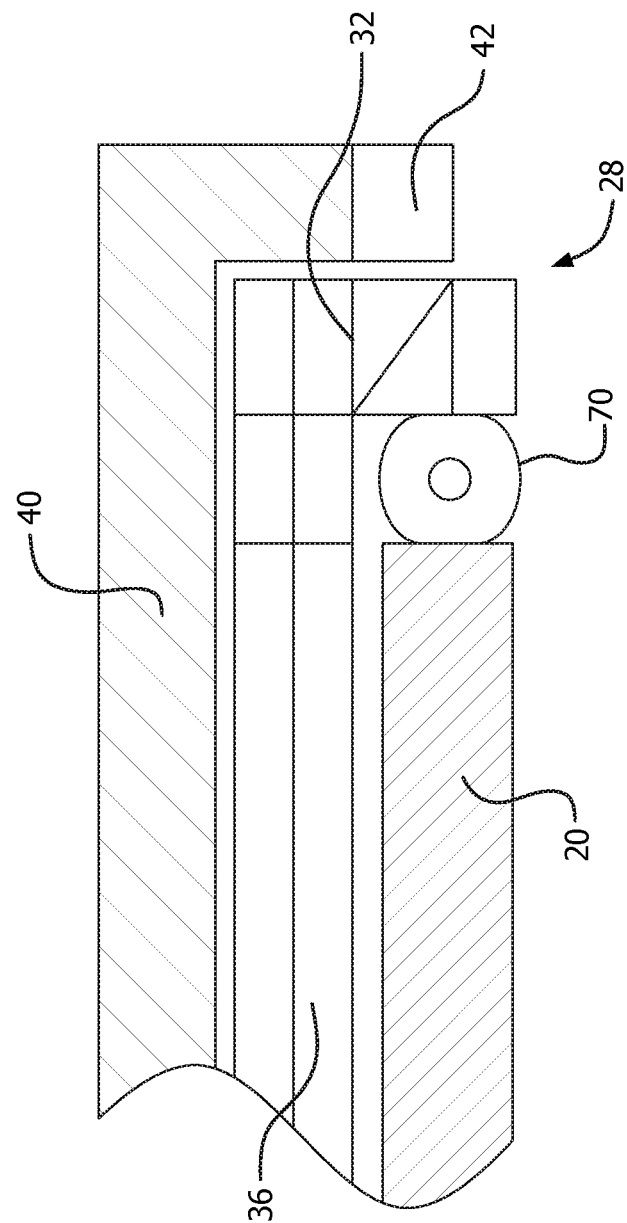
FIG. 7 is an illustration of an optional airbag safety feature which may be used in conjunction with the vehicle of FIG. 1.

FIG. 7 depicts an optional airbag safety feature which may be used in conjunction with the vehicle 10. This feature includes an inflatable airbag 70 positioned adjacent to the battery pack 20. In one embodiment, the airbag 70 is positioned beneath the side rail 32 and/or between battery pack 20 and the side rail 32. The airbag 70 may be configured to automatically inflate upon the detection of an impact force, thereby providing additional protection to the battery pack 20. In an alternative embodiment, the airbag 70 may be configured to surround at least a portion of the battery pack 20. For instance, the airbag 70 may be configured to form a protective bubble around the battery pack 20.

Returning to FIG. 6, an exemplary fastening mechanism 64 for securing the battery pack 20 to the frame structure 28 is illustrated. In an exemplary embodiment, the fasting mechanism 64 includes a flange 66 extending from a portion of the container 50 (e.g., a bottom portion) and a plurality of fasteners 68 which extend through apertures in the flange 66. The plurality of fasteners 68 are secured to a portion of the frame structure 28, such as a flange or flanges attached to a lower portion of a corresponding side rail 32.

The fastening mechanism 64 is preferably configured to allow for ease of connection of the battery pack 20 to the frame structure 28. In order to achieve this functionality, a variety of different connectors may be used as the fasteners 68. For example, fastener 68 may be a single-sided fastener, a blind bolt, a latching mechanism, etc. In this way, attachment and detachment of the battery pack 20 to the frame structure 28 may be done quickly and easily to facilitate exchanging of battery packs 20 (e.g., swapping a discharged battery pack with a charged battery pack).

Disclosed embodiments are applicable to providing a vehicle 10 which is configured to accommodate the replacement of a battery pack 20. In this way, disclosed embodiments are particularly applicable to electric vehicles which are manufactured with the intent to remove and replace a battery pack when the electrical energy devices in the battery pack are discharged. The viability of this type of system may depend at least in part on the ease with which the battery packs may be interchanged. The disclosed embodiments include features that allow for quick and easy battery pack replacement while maintaining the necessary functionality and level of safety.

The disclosed configuration in which a rigid frame structure is integrally formed with a vehicle chassis provides several advantages which improve the ease and speed with which battery packs can be interchanged. For example, the disclosed frame structure provides a protective structure which alleviates the need for a rigid frame to be formed within the battery pack itself. This reduces the weight of the battery pack, rendering it easier for a user to handle during a battery pack replacement operation.

An additional advantage of the disclosed rigid frame structure is the inhibiting of impact forces from even reaching the battery pack. Because the rigid cross rails carry the load of the impact, the strength of the connection between the vehicle and the battery pack is less critical than in configurations in which the connection serves as a bridge for directly transferring impact forces from the vehicle to the battery pack. While previous systems may require more than one hundred bolts to lock a battery pack into place, the disclosed system can utilize less connection points and fasteners that are more easily removable, thereby improving the speed and ease with which a battery pack may be replaced.

The frame structure described herein is configured to provide the above advantages because it sufficiently protects a battery pack from harmful damage during a collision. The additional safety features described in here may optionally be included in order to further ensure that the battery pack is protected during a collision, and thereby further allowing for the implementation of the replaceable battery pack system described herein.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A vehicle, comprising:
   a body forming a passenger compartment;
   a chassis supporting the body, the chassis including a frame structure comprising:
   a pair of side rails running longitudinally along the body;
   a pair of end rails extending perpendicular to the side rails and disposed at longitudinal ends of the side rails;
   a plurality of rigid cross rails extending perpendicular to the side rails and attached at opposing ends to the side rails, wherein each cross rail of the plurality of rigid cross rails are disposed between the pair of end rails and spaced apart from one another; and
   a bay defined between each adjacent pair of cross rails of the plurality of rigid cross rails; and
   a battery system including a battery pack having a plurality of electrical storage devices, the battery pack being secured to the side rails and removably positioned in the bay, the battery pack having a container including a plurality of channels extending perpendicular to the side rails, and wherein each channel of the plurality of channels receives a respective cross rail of the plurality of rigid cross rails,
   wherein each cross rail includes a first portion and a second portion that extends perpendicular to the first portion,
   wherein each first portion contacts a top surface of the container adjacent to a respective channel and each second portion extends into the respective channel, and
   wherein each first portion is hollow and includes a flange which extends outwardly and contacts the top surface of the container.

2. The vehicle of claim 1, wherein the side rails include interconnected horizontally-extending panels, diagonally-extending panels, and vertically-extending panels,
   wherein the diagonally extending panels and edges of the battery pack define a gap between the battery pack and the side rails, and
   wherein the body includes a floor panel, and the frame structure and the battery pack are positioned beneath the floor panel.

3. The vehicle of claim 2, further comprising:
   an inflatable element positioned in the gap to protect the battery pack from a collision force, wherein the frame structure is connected to a pair of axles of the vehicle.

4. The vehicle of claim 1, wherein each channel of the plurality of channels is formed in an upper portion of the battery pack, and wherein each second portion is hollow.

5. The vehicle of claim 4, wherein each channel of the plurality of channels formed in the battery pack has a corresponding shape to the respective cross rail of the plurality of rigid cross rails.

6. The vehicle of claim 5, wherein the plurality of channels includes at least three channels and the frame structure includes at least three cross rails.

7. The vehicle of claim 1, wherein the battery pack is a first battery pack and the battery system further includes a second battery pack.

8. The vehicle of claim 7, wherein the first battery pack and the second battery pack each include at least one channel, and the respective cross rail of the plurality of rigid cross rails is received in each channel.

9. The vehicle of claim 1, wherein the bay includes an end bay disposed between an end rail of the pair of end rails and an adjacent cross rail of the plurality of rigid cross rails and the battery pack is positioned in each of the bays.

10. A battery protection system, comprising:
a vehicle frame structure, comprising a pair of longitudinally-extending side rails interconnected by a pair of end rails extending perpendicular to the side rails and disposed at longitudinal ends of the side rails and by a plurality of rigid, transversely-extending cross rails, the vehicle frame structure defining a plurality of bays between the side rails and separated by the end rails and cross rails; and
a battery pack comprising a plurality of electrical storage devices enclosed in a container, the container including a plurality of channels defined in an upper portion thereof,
wherein the battery pack is removably positioned in at least two of the plurality of bays with the container secured to the side rails and each cross rail of the plurality of cross rails positioned in respective channels of the plurality of channels,
wherein each cross rail includes a first portion and a second portion that extends perpendicular to the first portion,
wherein each first portion contacts a top surface of the container adjacent to a respective channel and each second portion extends into the respective channel, and
wherein each first portion is hollow and includes a flange which extends outwardly and contacts the top surface of the container.

11. The battery protection system of claim 10,
wherein the side rails include interconnected horizontally-extending panels, diagonally-extending panels, and vertically-extending panels, and
wherein the diagonally extending panels and edges of the battery pack define a gap between the battery pack and the side rails.

12. The battery protection system of claim 11, further comprising:
an inflatable element position in the gap to protect the battery pack from a collision force, wherein the plurality of cross rails are tapered.

13. The battery protection system of claim 12, wherein each channel includes a pair of converging side walls which form the taper of the cross rail.

14. The battery protection system of claim 10, wherein the side rails include a ridge, and wherein each cross rail is longer than a corresponding channel such that a portion of the cross rail extends laterally out of the channel and contacts the ridge.

15. The battery protection system of claim 10, further including a fastening mechanism for securing the battery pack to the frame structure, wherein each second portion is hollow.

16. The battery protection system of claim 15, wherein the fastening mechanism includes a flange extending from the battery pack and a plurality of fasteners extending through apertures formed in the flange.

17. The battery protection system of claim 16, wherein the fasteners are single-sided fasteners or blind bolts.

18. The battery protection system of claim 10, wherein the battery pack includes groups of electrical storage devices separated by a partition.

19. The battery protection system of claim 18, wherein the partition is aligned with at least one channel of the plurality of channels such that the at least one channel sits above the partition, and wherein the partition is in a lower portion of the container, and wherein the partition has a top surface that is coplanar with top surfaces of the plurality of electrical storage devices.

20. A battery pack, comprising:
a container;
a plurality of electrical storage devices at least partially enclosed in the container;
a fastening mechanism for securing the container to a frame structure; and
a plurality of channels defined in an upper portion of the container; and
at least one partition defined in a lower portion of the container to separate groups of the plurality of electrical storage devices form one another,
wherein the at least one partition is aligned with at least one of the plurality of channels such that the at least one channel sits above the at least one partition, and
wherein each channel of the plurality of channels includes a pair of converging side walls configured to receive a tapered cross rail of a plurality of rigid cross rails of the frame structure.

* * * * *